United States Patent [19]

Sun et al.

[11] Patent Number: 5,227,357

[45] Date of Patent: Jul. 13, 1993

[54] METHOD FOR PREPARING A CATALYST FOR REFORMING NAPHTHA

[75] Inventors: Fengduo Sun; Yuanguo Xu, both of Fushun, China

[73] Assignee: China Petro-Chemical Corporation, Beijing, China

[21] Appl. No.: 670,758

[22] Filed: Mar. 15, 1991

[30] Foreign Application Priority Data

Mar. 17, 1990 [CN] China ................. 90101354.4

[51] Int. Cl.⁵ ............................ B01J 27/135
[52] U.S. Cl. ........................ 502/227; 502/230
[58] Field of Search ........................ 502/227, 230

[56] References Cited

U.S. PATENT DOCUMENTS

| | | | |
|---|---|---|---|
| 3,415,737 | 12/1968 | Kluksdahl | 208/139 |
| 4,176,088 | 11/1979 | Antos | 252/441 |
| 4,178,268 | 12/1979 | Antos et al. | 252/439 |
| 4,238,372 | 12/1980 | Buss et al. | 502/334 |
| 4,356,081 | 10/1982 | Gallagher et al. | 208/139 |
| 4,480,048 | 10/1984 | Bournonville et al. | 502/227 |

*Primary Examiner*—Patrick P. Garvin
*Assistant Examiner*—Brent M. Peebles
*Attorney, Agent, or Firm*—Nikaido, Marmelstein, Murray & Oram

[57] ABSTRACT

A naphtha-reforming catalyst is prepared by using aluminum hydroxide as a feed stock, which is acidificated in steam at high temperature, then shaped and calcined to form $\gamma$-$Al_2O_3$ support which is supported with metals of Pt, Re and Ti and halogens. The Pt content is 0.075–0.8 Wt %, Re/Pt ratio is 0.1–3.0 (Wt.). Since the $\gamma$-$Al_2O_3$ support having high purity, high crystallinity and concentrated middle pores has been adopted, the activity, selectivity and stability of the catalyst are increased considerably while the Pt content decreased.

10 Claims, 5 Drawing Sheets

METHOD FOR PREPARING A CATALYST FOR REFORMING NAPHTHA

FIELD OF THE INVENTION

This invention involves a naphtha-reforming catalyst and its preparation method.

BACKGROUND OF THE INVENTION

Catalytic reforming of naphtha plays an important part in increasing octane number and producing aromatic hydrocarbons. Recently, reforming technology and the catalyst therefor have been improved continuously and the developments in improving the catalyst performances are remarkable. Specifically, Pt-Re catalyst changes the stability of the catalyst itself considerably. In 1980s, it was pointed out that reaction performances of the catalyst containing higher content of Re (Re/Pt=2−3) were better than that of the conventional catalyst (Re/Pt=1).

Moreover, the carrier has been continually improved together with the introduction of metal Re component and the adjustment of Re/Pt ratio. Among reforming catalyst gamma-alumina exhibits excellent performances. More specifically, gamma-alumina carrier modified by various methods has improved the reaction performances of the catalyst in varying degrees. Proper modification of the gamma-alumina carrier can not only improve the performances of the catalyst, but also decrease the content of noble metal Pt, so that the cost is reduced.

The alumina differs greatly in performances owing to different methods of preparation and treatment, thus exerting great influence on catalyst performances in application. As exemplified in U.S. Pat. No. 4,178,268, SB alumina which is a byproduct from Ziegler synthesis reaction is used as a support to prepare reforming catalysts which exhibit a good reactivity. DE Pat. 3,508,746 introduces a reforming catalyst using alumina as a support which is prepared by hydrolyzing aluminum alkyl produced by the reaction between Al and $C_m$—OH(m>4). Chinese Pat. 87107556.3 introduces another highly selective and active catalyst using HP alumina as a support which is prepared by the method exemplified in Chinese Pat. 85100218. In brief, the above-mentioned catalysts are prepared through different ways and disposal methods to form different gamma-alumina supports, so as to enhance the reaction performances of the catalyst. Generally, above-mentioned gamma-alumina are prepared by continually disposing dry aluminum hydroxide powders or wet filtered cake: acidification with nitric acid or other acids at room temperature, forming, drying and calcining. Thus prepared gamma-alumina has a poor crystallinity, small porosity, and larger proportion of small pores, especially, poor thermal stability. It is inevitable that the reaction performances, e.g. activity, stability, especially the selectivity of the catalyst appear to be unsatisfied.

The lowest content of Pt of the reforming catalyst used in industry is above 0.2 Wt. %, usually 0.22–0.3 Wt. % in order to assure its reactivity. In addition, the selectivity of the currently used catalyst with high Re/Pt ratio (Re/Pt>2.0) is lower than that of conventional catalyst (Re/Pt=1). The yield of reforming liquid and the concentration of hydrogen are low at initial stage, therefore, it can only be used in the last reactor of industrial reforming equipment to prevent the yield of liquid products from excessive losing.

The object of this invention is to provide a suitable method to overcome the deficiency of the prior arts and to prepare the gamma-alumina with high crystallinity, proper bulk density and concentrated middle pores so as to yield a highly selective, active and stabilized Pt/Re reforming catalyst containing less noble metals. Specifically, a catalyst of better performances with higher Re/Rt ratio (Re/Pt=3) has been prepared.

SUMMARY OF THE INVENTION

This invention relates to a method for preparing naphtha-reforming catalyst containing metals of Pt, Re and Ti and halogen comprising the steps of acidifying aluminum hydroxide in a certain concentration at 60°–250° C. in a steam atmosphere for 2-15 hours and then shaping, calcining the shaped aluminum hydroxide at 450°–700° C. to form gamma-alumina support which is supported with Pt, Re and Ti and halogen, the contents of said metals and halogen being in amount of Pt 0.075–0.80, Re 0.075–1.50, Ti 0.00–0.40, halogen 0.50–2.00 based on the weight percentage of dried alumina, wherein the halogen is chlorine (Cl) preferably.

In more exactly words, this invention is that the raw material, e.g. aluminum hydroxide is acidified in the atmosphere of aqueous vapour at high temperature, and then formed and calcined to form gamma-alumina support, on which metals such as Pt, Re, Ti and halogens are carried. The raw material used in this invention is SB aluminum hydroxide. The SB aluminum hydroxide corresponds to the same kind of aluminum hydroxide produced by the Conde A Chemical Limited, a German company, that is Boehmite or Alpha-aluminum monohydrate. It is also the same as HP aluminum hydroxide which is made by the methods of Chinese Patent No. 85 100 218, or as HT aluminum hydroxide which is made of aluminum chloride and aqueous ammonia by continual precipitation at high temperature, or as other kinds of aluminum hydroxide prepared by other methods, or as the mixture thereof.

BRIEF DESCRIPTION OF THE FIGURES

The figures of crystallization phases and aperture distribution of gamma-alumina support prepared by different materials and methods are given below.

FIG. 3 (A).(B).(C) are the aperture distribution charts (measured by D2500 adsorption measurement) of SB powder, r-11 and r-9 support. It can be seen from the figures that probable aperture of r-9support changes to larger and middle pore is concentrated compared with that of SB powder, gamma-alumina, r-11 support prepared by conventional methods so that r-9 support has better properties.

DETAILED DESCRIPTION OF THE INVENTION

Figure 1:
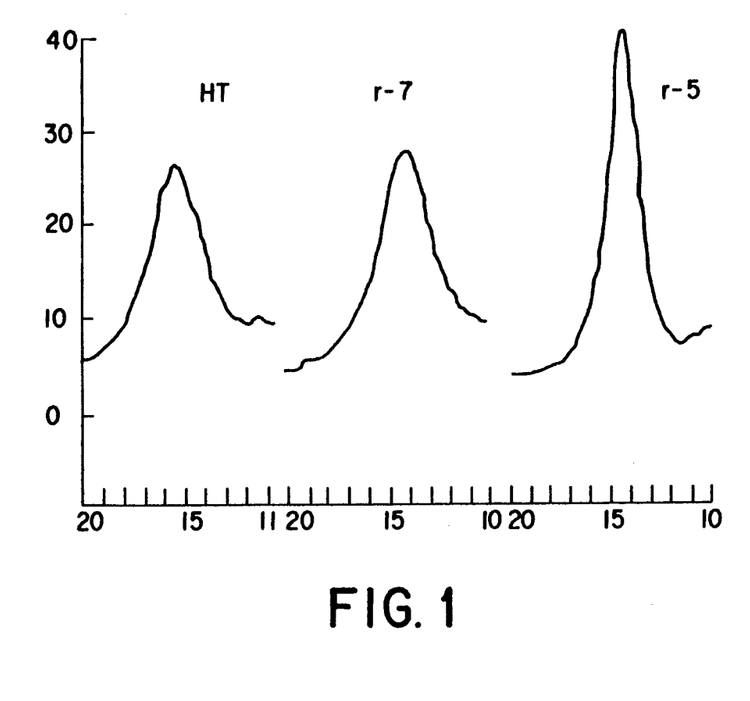
FIG. 1 is the crystallization phases pictures of HT dry powder, r-7 support acidified and shaped at room temperature and r-5 support acidified and shaped in steam atmosphere at high temperature. The figure shows that r-7 support shaped by using conventional method has been improved little compared with HT powder. The diffraction peak of r-5 support acidified in steam atmosphere at high temperature is higher and more narrow. This indicates that the gamma-alumina crystal is larger and shaped more completely.
Figure 2:
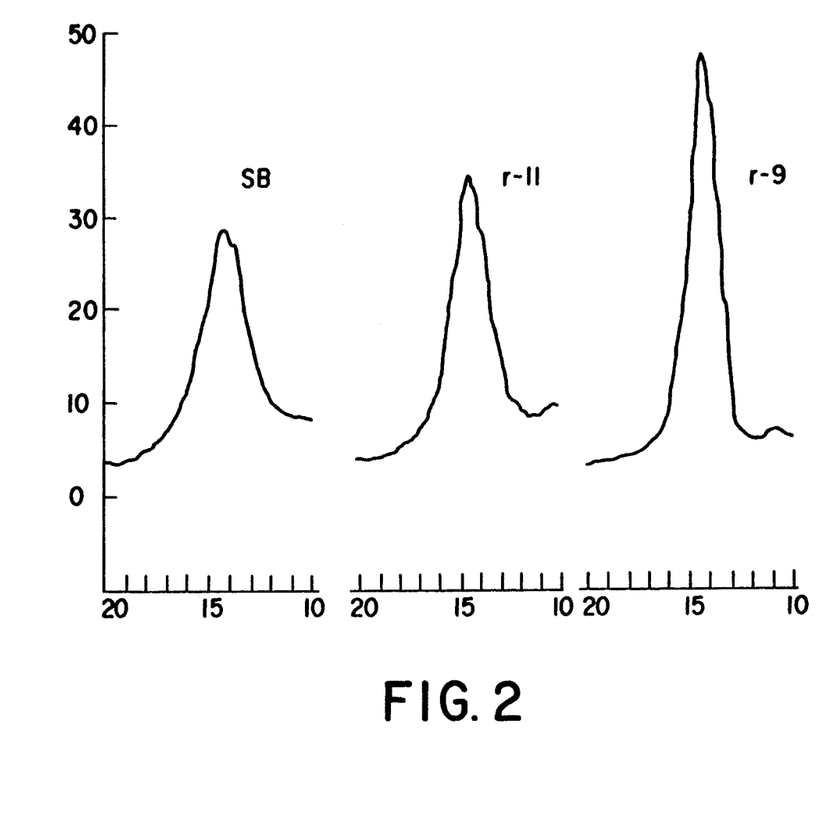
FIG. 2 is the X-ray diffraction pictures of SB powder, r-11 support acidified and shaped at room temperature, r-9 support acidified in steam at high temperature. The figure shows that the diffraction peak of r-9 support is apparently higher than that of raw materials and r-11 support, which indicates bigger crystal and more complete crystallization.
Figure 3A:
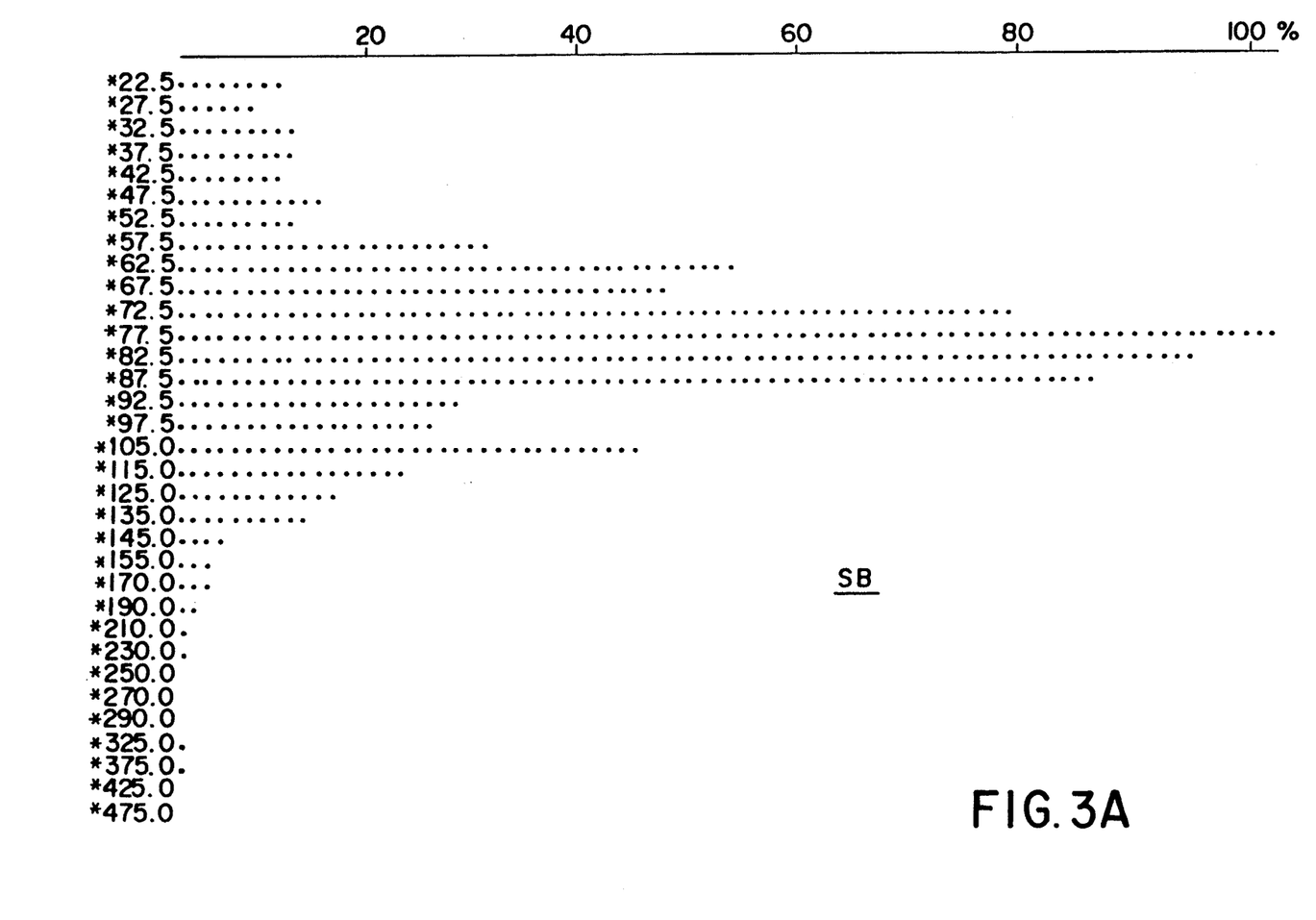
Figure 3B:
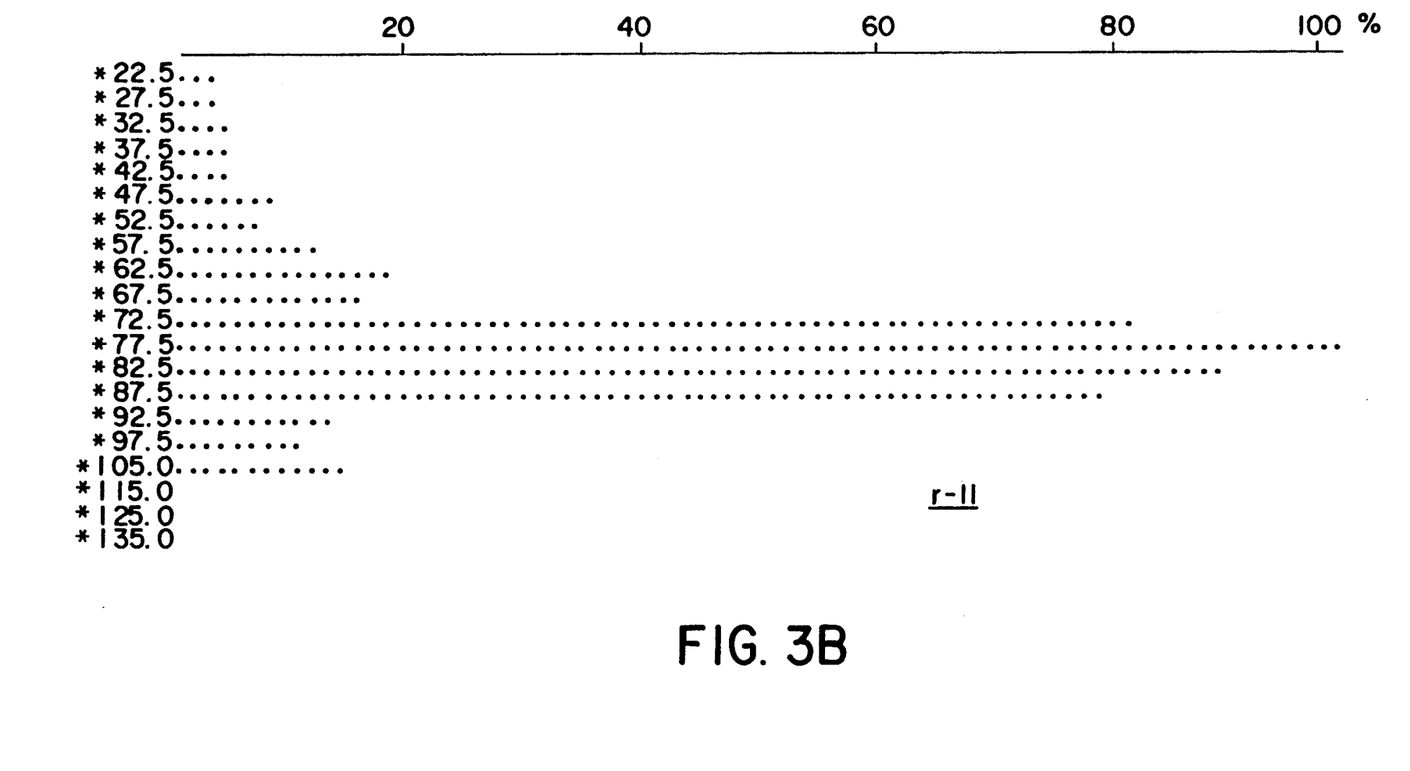
Figure 3C:
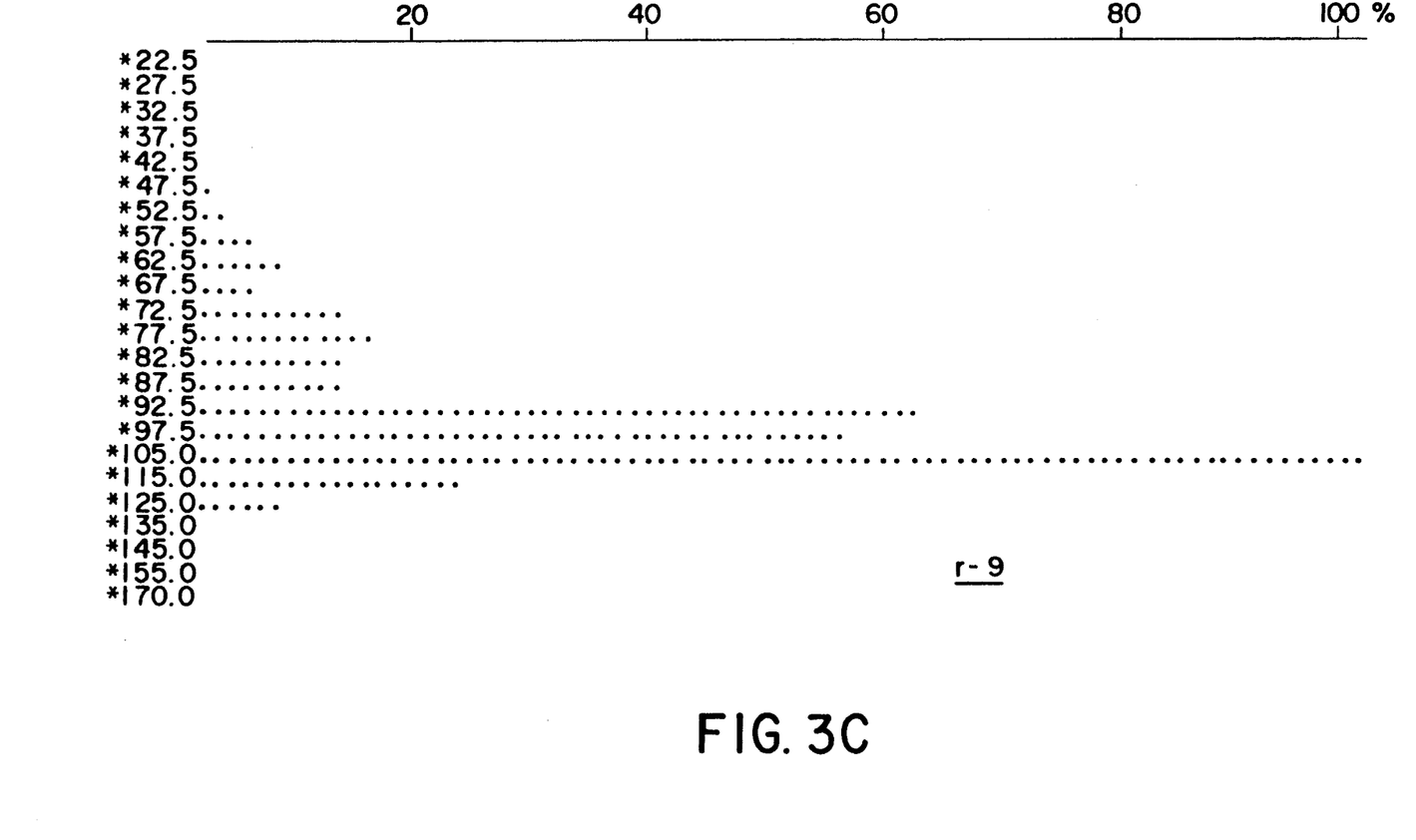

The preparation method of gamma-alumina: The mixture of SB aluminum hydroxide, HP aluminum hydroxide prepared by Ziegler method or HT aluminum hydroxide prepared by precipitation at high temperature or Al(OH)$_3$ prepared by other methods is used as raw material which is acidified in steam at high temperature. The temperature is 60°–250° C., preferably temperature 120°–160° C. The acidification time is 2–15 hours, preferably 3–6 hours. Then it is shaped into stripe by extruding and rolling. The sample is dried at 50°–70° C. for 3–7 hours, and then at 100°–150° C. for 4–16 hours. We can get gamma-alumina support after it is calcined at 450°–750° C., preferably 550°–650° C. for 4–10 hours.

The catalyst preparation procedure: platinum compound, preferably, chloroplatinic acid or ammonium platinic chloride, rhenium compound, preferably, perrhenic acid or ammonium perrhenate of carbonyl rhenium, hydrochloric acid or trichloroethanoic acid and deionized water are stoichemetrically mixed to form a immersion. Said immersion is used to infuse gamma-alumina support at room temperature, under the normal pressure or decreased pressure. The volume ratio of support to solution is 1.0–2.0, preferably 1.2–1.6. The infusion time is 8–24 hours. After filtered, it is dried at 60°–90° C. for 6–10 hours, at 105°–125° C. for 10–24 hours, activated at 450°–550° C., preferably 460°–520° C. for 4–12 hours in dry air. The ratio of air to sample is 600–1200, preferably 600–900. Then it is reduced in hydrogen at 450°–500° C. for 2–10 hours. The air/sample ratio is 600–1200, preferably 600–900. The catalyst is presulfurized by either adding H$_2$S into H$_2$ stream or being presulfurized in reforming reactor.

The metal component can also be infused into catalyst step by step, and it must be dried and calcined after each step. The Ti component can be supported by either infusion or coprecipitation method which is preferred. Either TiCl$_3$ or Ti(NO$_3$)$_3$ can be used, the former is preferred.

The most preferred halogen component is chlorine. It can be introduced into the catalyst from PtCl$_3$O$_3$, HCl, or other chlorine-containing acid during preparation, or from organic halide when the catalyst is used.

The catalyst composition of this invention is based on the weight percentage of dry alumina Pt 0.075–0.8, preferably 0.10–0.25, Re 0.075–1.50, preferably 0.10–1.00, Ti 0.00–0.40, preferably 0.01–0.20, Cl 0.5–2.0, preferably 0.81–1.8. The ratio of Re to Pt is 0.1–3.0, preferably 1.2–2.5.

The catalyst shaping method of this invention: We can use various methods for shaping catalyst, such as sphere-dripping, sphere-rolling, extruding and pressing etc. sphere-dripping and extruding are preferred. The shape of the catalyst can be ball, stripe (column, tri-vane and tetra-vane) plate or grain. The ball and stripe shape are preferred.

The catalyst of this invention must be presulfurized before it is used as same as Pt/Re catalyst. This can be carried out by adding H$_2$S or other organic or inorganic sulfuret into H$_2$ or N$_2$ steam (gas/sample ratio 500–100). The sulphur content is 0.01–2.00%, preferably 0.05–0.2%.

The catalyst of this invention can be used in the reforming of prehydrogenated straight naphtha having fraction of 60°–220° C. or naphtha having fraction of 60°–220° C. produced by hydrogenation cracking, catalytic cracking or coking, preferably in the reforming of straight naphtha.

The gamma-alumina support of this catalyst has been acidified in steam at high temperature so as to prepare the catalyst with high crystallinity, proper bulk density and concentrated middle pores. Compared with catalyst prepared by conventional method using the same feed stock, the catalyst of this invention has merits of low content of Pt, high selectivity and stability. Under the same reaction conditions, the octane value of the produced oil by the catalyst of this invention is increased by 1–2 units when the contents of aromatic hydrocarbons in the produced oil are the same, the yield of the liquid products is increased by 1.0–3.2 Wt. %. The catalyst of this invention has low carbonaceous deposits during the same operation cycle.

EXAMPLE 1

The gamma-alumina in this example was prepared by acidifying the HP Al(OH)$_3$ in steam at high temperature. 100 g HP Al(OH)$_3$ dried powder or wet cake was charged into 400 g deionized water. Then the sample was acidified in steam at 140° C. for 12 hours. For every 100 g HP Al(OH)$_3$, 12 ml nitric acid was needed. The sample was drop shaped in the oil-NH3 shaping column. After the wet ball was put in aqueous ammonia for 2 hours. it was filtered and washed for 2–3 times using clean water. Then it was dried at 60° C. for 4 hours, following at 120° C. for 10 hours, The dried ball was calcined for 4 hours. at 650° C. in air so as to prepare gamma-alumina support numbered r-1.

The preparation method of gamma-alumina containing Ti was the same as that of r-1 except that the TiCl$_3$ solution was added stoichemetrically added when nitric acid was added. The catalyst was numbered r-2.

The catalyst prepared by acidifying at room temperature without having Ti was numbered r-3, while the catalyst containing Ti was numbered r-4.

The physical-chemical properties of r-1, r-2, r-3 and r-4 were listed in Table 1.

EXAMPLE 2

In this example, it was shown that the preparation method of gamma-alumina support from raw material HT aluminum hydroxide which was made from AlCl$_3$ and NH$_4$OH by high-temperature precipitation method.

The damp cake of aluminum hydroxide which was made by high-temperature precipitation method was acidified for 8 hours in steam at 150° C., and then shaped by sphere-dripping. The other preparation conditions were the same as Example 1.

Titanium was added in the high-temperature precipitation. The gamma-alumina containing titanium was numbered r-5, while the gamma-alumina without having titanium was numbered r-6.

The gamma-alumina support containing titanium acidified at room temperature was named as r-7, while the gamma-alumina without having titanium was named as r-8.

The physical-chemical properties of supports r-5, r-6, r-7 and r-8 were listed in Table 2.

EXAMPLE 3

In this example, the preparation method of gamma-alumina support from the raw material SB aluminum hydroxide was introduced. 300 g dried power of SB aluminum hydroxide was used, and mixed with 1320 g deionized water, and then acidified for 6 hours in steam at 160° C. 3300 ml nitric acid (1:1) was added in, and then the sample was shaped to spherical, dried and calcined to form gamma-alumina support, Which was named as r-9.

Support r-9 was acidified with $H_2SO_4$ to form gamma-alumina support containing sulphur, which was named as r-10.

gamma-alumina support which was acidified at room temperature was r-11. The physical-chemical properties of the supports were listed in Table 3.

EXAMPLE 4

The preparation of support gamma-alumina from the raw material HT aluminum hydroxide was introduced in this example. The raw material was acidified in steam at high-temperature, and extruded to form strip gamma-alumina having no Ti was r-13.

HT was acidified at room temperature, and extruded to form strip gamma-alumina containing Ti. It was named as r-14, while the strip gamma-alumina not containing Ti was r-15. The physical-chemical properties of gamma-alumina in this example were listed in Table 4.

EXAMPLE 5

This example relates to a method for preparing the catalyst using HP gamma-alumina as support.

200 g gamma-alumina (r-1) support as prepared in Example 1 was charged to a mixture of chloroplatinic acid, perrhenic acid and hydrochloric acid at room temperature wherein the contents of Pt, Re, Cl based on the weight percent of alumina were as follows: Pt 0.15, Re 0.30, Cl 1.5. liquid/solid ratio was 1.3. The mixture was filtered after impregnating for 24 hours. The wet catalyst was dried at 60° C. for 8 hours and 110° C. for 14 hours, then activated at 510° C. for 6 hours, thus the catalyst C-1 was prepared.

The preparation methods of catalysts C-2, C-3, and C-4 were the same as that of C-1, in which r-2, r-3, r-4 were used as supports respectively. However, the content of Pt herein was different from that of C-1.

Catalysts C-5, C-6, C-7 and C-8 were prepared by using r-5, r-6, r-7 and r-8 as support respectively. The preparation methods were basically the same as that of C-1 excepts that these catalysts should be reduced by $H_2$ and pre-sulphurized.

The methods of preparing C-9, C-10, C-11 were the same as that of C-5 using r-9, r-10, r-11 as supports respectively.

The methods of preparing C-12, C-13, C-14 and C-15 were the same as that of C-1 using strip r-12, r-13, r-14 and r-15 as supports respectively.

COMPARATIVE EXAMPLE 1

This example relates to the compositions and properties of the catalysts and the supports.

The compositions of the catalysts prepared using different gamma-alumina as support were given in Table 5. Catalyst M was CB-5 produced by Changling Oil Refinery of China Petrochemical Corp. The support was gamma-alumina treated by acid at room temperature.

COMPARATIVE EXAMPLE 2

This example relates to the test of the activity and selectivity of the invented catalysts C-2 and C-2D, compared with that of catalyst C-4.

The test was completed by passing $H_2$ through a single pipe reactor having the volume of 100 ml. The feed oil was Daqing distillated oil with rectified temperature ranging from 80° C. to 180° C. Its properties were given in Table 5. Test condition: reaction pressure of 1.18 MPa, gas/oil ratio of 1200 (Volume), space velocity of 2.0/hours and reaction temperature of 480° C., 490° C., 500° C. respectively. Testing results were listed in Table 6.

It can be seen from Table 7 that the selectivity and activity of invented catalysts were superior to that of compared catalyst.

COMPARATIVE EXAMPLE 3

This example was a comparative experiment of catalyst stability.

The evaluation instrument and the feed oil were the same as that in Example 2. Evaluation conditions: reaction temperature of 520° C., Pressure of 0.69 MPa, gas/oil ratio of 800 (volume), space velocity of 2.0/hours (volume), reaction time of 72 hours.

The evaluation conditions in activity-recovered stage were the same as that in initial activity stage, while the reaction temperature was 500° C. The testing results were listed in Table 7. The results indicated that the stability of catalysts C-2, C-2D was superior to that of compared catalyst C-4.

COMPARATIVE EXAMPLE 4

This example was the selectivity and activity experiments of the catalyst of this invention and was compared with those of other related catalysts.

The evaluation instruments and conditions were the same as Example 2. The evaluated feed oil was the 60°–130° C. rectified fraction, the properties of which was listed in Table 8. The reaction performance of C-9, C-9B, C-9D, C-9E, C-11 and industrial catalyst M (CB-5) were evaluated. The evaluated results were listed in Table 9. Compared with the catalyst C-11 and industrial catalyst M which had not been acidified at high temperature in steam, liquid yield of the catalyst C-9, C-9B, C-9D, C-9E was increased by 1–4 wt. % when the contents of the aromatic hydrocarbons were the same. The MONC was increased by 1–2 units. This indicated that selectivity and activity of the catalyst of this invention were superior to that of compared catalyst.

COMPARATIVE EXAMPLE 5

This example was a comparative test of catalyst stability, which was also compared with industrial catalyst M.

The evaluation feed oil was the same as that in Example 4. The evaluation instrument and conditions were the same as that comparative in Example 3. The evaluation results were listed in Table 11. The results indicated that the stability of this invented catalyst C-9, C-9B, C-9D and C-9E was superior to that of compared catalysts C-11 and M.

COMPARATIVE EXAMPLE 6

A high-pressure continued microreactor, using GC as detector had been used to make a evaluating comparison among these invented catalysts C-9 and C-11 and industrial catalyst M.

The feed stock was hexane, The evaluation conditions: pressure 1.0 MPa, Space velocity 3.0/hour, gas-/oil 1200, reaction temperature. 480° C., 490° C. and 500° C. respectively. The results were listed in Table 12. The results indicated that the activity of catalyst C-9 was superior to that of compared catalyst C-11 and industrial catalyst M.

COMPARATIVE EXAMPLE 7

A high-pressure continued microreactor using GC as detector had been used to make a evaluation comparison among invented catalysts C-5, C-12 and C-7, C-14.

The evaluation instrument, feed stock and evaluation conditions were the same as that in comparative Example 6. The results were listed in Table 13. It can be seen from the results that the microactivity of these invented catalysts was superior to that of compared catalysts C-7, C-14 which had not been acidified at high temperature in steam, Whatever the catalysts of this invention were ball shape C-5 or stripe shape C-12.

TABLE 1

Physical-chemical Properties of $\gamma\text{-Al}_2\text{O}_3$ Prepared by Different Methods

| Name of support | Surface Area $m^2/g$ | pore volume ml/g | Bulk density g/ml | Aperture Distribution (%), Å | | | | | | probable pore diameter (Å) |
|---|---|---|---|---|---|---|---|---|---|---|
| | | | | <20 | 20–60 | 60–100 | 100–150 | 150–200 | >200 | |
| r-1 | 194 | 0.614 | 0.706 | 0 | 6.3 | 62.0 | 31.5 | 0.2 | 0 | 115 |
| r-2 | 192 | 0.602 | 0.718 | 0 | 9.4 | 52.0 | 37.7 | 0.3 | 0.6 | 115 |
| r-3 | 198 | 0.533 | 0.767 | 0 | 20.4 | 40.6 | 29.5 | 8.5 | 1.0 | 105 |
| r-4 | 196 | 0.521 | 0.772 | 0 | 22.6 | 39.4 | 27.6 | 9.2 | 1.2 | 105 |

TABLE 2

Physical-chemical Properties of Samples r-5, r-6, r-7, r-8

| Name of support | Surface Area $m^2/g$ | Pore volume ml/g | Bulk Density g/ml | Aperture Distribution (%), Å | | | | | | Probable Pore Diameter (Å) |
|---|---|---|---|---|---|---|---|---|---|---|
| | | | | <20 | 20–60 | 6–100 | 100–150 | 150–200 | >200 | |
| r-5 | 187 | 0.530 | 0.732 | 0 | 6.8 | 60.0 | 30.8 | 1.4 | 1.0 | 120 |
| r-6 | 192 | 0.520 | 0.740 | 0 | 7.5 | 58.2 | 32.6 | 1.0 | 0.7 | 115 |
| r-7 | 205 | 0.450 | 0.820 | 0 | 40.5 | 41.8 | 14.0 | 2.2 | 1.5 | 105 |
| r-8 | 201 | 0.460 | 0.818 | 0 | 41.0 | 42.2 | 13.9 | 1.8 | 1.1 | 105 |

TABLE 3

Physical-chemical Properties of Samples r-9, r-10, r-11

| Name of support | Surface Area $m^2/g$ | Pore volume ml/g | Bulk density g/ml | Aperture Distribution (%), Å | | | | | | probable pore diameter (Å) |
|---|---|---|---|---|---|---|---|---|---|---|
| | | | | <20 | 20–60 | 60–100 | 100–150 | 150–200 | 7200 | |
| r-9 | 198 | 0.621 | 0.708 | 0 | 6.9 | 64.6 | 27.7 | 0.3 | 0.5 | 115 |
| r-10 | 218 | 0.540 | 0.754 | 0 | 5.4 | 63.6 | 30.8 | 0.2 | 0 | 105 |
| r-11 | 224 | 0.486 | 0.837 | 0 | 17.4 | 69.4 | 12.5 | 0.4 | 0.3 | 77.5 |

TABLE 4

Physical-chemical Properties of Extruded Strip $\gamma\text{-Al}_2\text{O}_3$

| Name of support | Surface Area $m^2/g$ | Pore volume ml/g | Bulk density g/ml | Aperture Distribution (%), Å | | | | | | probable pore diameter (Å) |
|---|---|---|---|---|---|---|---|---|---|---|
| | | | | <20 | 20–60 | 60–100 | 100–150 | 150–200 | >200 | |
| r-12 | 201 | 0.589 | 0.712 | 0 | 6.9 | 62.5 | 28.8 | 1.0 | 0.8 | 125 |
| r-13 | 203 | 0.578 | 0.721 | 0 | 7.3 | 58.4 | 32.4 | 1.2 | 0.7 | 115 |
| r-14 | 221 | 0.456 | 0.813 | 0 | 42.8 | 41.5 | 13.8 | 1.3 | 0.6 | 105 |
| r-15 | 219 | 0.463 | 0.809 | 0 | 44.9 | 36.4 | 17.4 | 0.4 | 0.9 | 105 |

TABLE 5

Composition of Catalysts Prepared by Different Supports

| Catalyst No. | Catalyst Composition (wt. %) | | | | Re/Pt (Weight) | Content of Impurities (ppm) | | Support Name | Acidification Temperature |
|---|---|---|---|---|---|---|---|---|---|
| | Pt | Re | Ti | Cl | | Fe | Na | | |
| C-1 | 0.15 | 0.29 | — | 1.42 | 1.93 | 52 | 15 | r-1 | High |
| C-2 | 0.14 | 0.28 | 0.2 | 1.39 | 2.00 | 47 | 6 | r-2 | High |
| C-2B | 0.10 | 0.21 | 0.19 | 1.28 | 2.10 | 45 | 8 | r-2 | High |
| C-2D | 0.25 | 0.40 | 0.19 | 1.34 | 1.60 | 45 | 8 | r-2 | High |
| C-3 | 0.20 | 0.21 | — | 1.45 | 1.05 | 49 | 9 | r-3 | Room |
| C-4 | 0.15 | 0.30 | 0.18 | 1.01 | 2.00 | 61 | 8 | r-4 | Room |

TABLE 5-continued

Composition of Catalysts Prepared by Different Supports

| Catalyst No. | Catalyst Composition (wt. %) | | | | Re/Pt (Weight) | Content of Impurities (ppm) | | Support | |
|---|---|---|---|---|---|---|---|---|---|
| | Pt | Re | Ti | Cl | | Fe | Na | Name | Acidification Temperature |
| C-4B | 0.26 | 0.25 | 0.18 | 1.12 | 0.96 | 60 | 12 | r-4 | Room |
| C-5 | 0.15 | 0.31 | 0.15 | 1.52 | 2.07 | 150 | 35 | r-5 | High |
| C-6 | 0.21 | 0.25 | — | 1.32 | 1.19 | 120 | 42 | r-6 | High |
| C-7 | 0.15 | 0.29 | 0.17 | 1.28 | 1.93 | 110 | 51 | r-7 | Room |
| C-8 | 0.075 | 0.16 | — | 1.43 | 2.13 | 125 | 53 | r-8 | Room |
| C-9 | 0.15 | 0.30 | 0.14 | 1.36 | 2.00 | 84 | 10 | r-9 | High |
| C-9B | 0.10 | 01.9 | 0.13 | 1.18 | 1.90 | 78 | 12 | r-9 | High |
| C-9D | 0.25 | 0.36 | 0.13 | 1.23 | 1.44 | 83 | 13 | r-9 | High |
| C-9E | 0.45 | 0.30 | 0.14 | 1.40 | 0.67 | 72 | 11 | r-9 | High |
| C-10 | 0.14 | 0.29 | 0.13 | 1.29 | 2.07 | 76 | 12 | r-10 | High |
| C-11 | 0.16 | 0.30 | 0.14 | 1.35 | 1.88 | 79 | 16 | r-11 | Room |
| C-12 | 0.14 | 0.31 | 0.21 | 1.42 | 2.21 | 98 | 32 | r-12 | High |
| C-13 | 0.22 | 0.44 | — | 1.18 | 2.00 | 105 | 42 | r-13 | High |
| C-14 | 0.15 | 0.30 | 0.19 | 1.34 | 2.00 | 125 | 35 | r-14 | Room |
| C-15 | 0.26 | 0.36 | — | 1.25 | 1.38 | 118 | 29 | r-15 | Room |
| M | 0.48 | 0.32 | 0.21 | 1.46 | 0.67 | 121 | 38 | r-$Al_2O_3$ | Room |

TABLE 6

Properties and Composition of Feed Oil of 80–180° C. Fraction

| Density $d_4^{20}$ | Fraction (°C.) | | | | | | | Hydrocarbon Composition | | | |
|---|---|---|---|---|---|---|---|---|---|---|---|
| | Distillation start point | 10% | 30% | 50% | 70% | 90% | Distillation end point | Alkane | Cycloalkane | Aromatic hydrocarbon | Aromatic potential |
| 0.7340 | 93 | 102 | 107 | 112 | 122 | 139 | 178 | 49.9 | 45.8 | 43 | 46.0 |

TABLE 7

Comparative Results of the Catalysts Performances

| | | Catalyst | | |
|---|---|---|---|---|
| | | C-2 | C-2D | C-4 |
| 480° C. | Octane Number MONC | 84.1 | 84.2 | 83.4 |
| | Liquid Yield (wt. %) | 84.3 | 85.0 | 82.9 |
| 490° C. | Octane Number MONC | 87.8 | 86.5 | 85.5 |
| | Liquid Yield (wt. %) | 80.6 | 81.4 | 81.2 |
| 500° C. | Octane Number MONC | 90.5 | 90.3 | 89.2 |
| | Liquid Yield (wt. %) | 78.4 | 78.5 | 77.5 |

TABLE 8

Comparing Experiments of Catalyts Stability

| | | Catalyst | | |
|---|---|---|---|---|
| Evaluation stage | | C-2 | C-2D | C-4 |
| Stability test | Initial octane number, MONC | 94.8 | 93.7 | 93.2 |
| | Termination octane number, MONC | 90.0 | 89.2 | 86.4 |
| | Difference | 4.8 | 4.5 | 6.8 |
| Activity-recovery test | Octane number in initial activity stage MONC | 90.5 | 90.3 | 89.2 |
| | Octane number in initial activity stage MONC | 84.8 | 84.5 | 82.1 |
| | Difference | 5.7 | 5.8 | 7.1 |
| | Carbonaeous deposit after operation wt. % | 4.8 | 5.2 | 7.3 |

TABLE 9

Properties of Feed Oil of 60–130° C. Fraction

| Density $d_4^{20}$ | Fraction (°C.) | | | | | | | Hydrocarbon composition | | | |
|---|---|---|---|---|---|---|---|---|---|---|---|
| | Distillation start point | 10% | 30% | 50% | 70% | 90% | Distillation end point | Alkane | Cycloalkane | Aromatic hydrocarbon | Aromatic hydrocarbon |
| 0.7210 | 82 | 90 | 94 | 100 | 118 | 126 | 143 | 53.13 | 44.62 | 2.25 | 43.52 |

TABLE 10

Comparison of Catalyst Performance

| | | Catalyst | | | | | |
|---|---|---|---|---|---|---|---|
| Item | | C-9 | C-9B | C-9D | C-9E | C-11 | M |
| 480° C. | Aromatic Content (wt. %) | 60.0 | 60.0 | 60.0 | 60.0 | 60.0 | 60.0 |
| | Liquid Yield (wt. %) | 81.7 | 81.5 | 81.8 | 82.1 | 79.2 | 80.5 |
| 490° C. | Aromatic Content (wt. %) | 65.0 | 65.0 | 65.0 | 65.0 | 65.0 | 65.0 |
| | Liquid Yield (wt. %) | 79.1 | 78.6 | 78.8 | 79.2 | 75.9 | 76.8 |
| 500° C. | Aromatic Content (wt. %) | 70.0 | 70.0 | 70.0 | 70.0 | 70.0 | 70.0 |
| | Liquid Yield (wt. %) | 76.5 | 75.4 | 76.4 | 76.2 | 73.3 | 74.9 |
| | MONC | 90.5 | 89.9 | 90.3 | 90.1 | 88.6 | 89.2 |

TABLE 11

Experimental Comparison Results of Catalysts Stability

| | | Catalyst | | | | | |
|---|---|---|---|---|---|---|---|
| Evaluation stage | | C-9 | C-9B | C-9D | C-9E | C-11 | M |
| Stability | Initial aromatic yield wt. % | 58.8 | 58.4 | 59.4 | 59.2 | 58.2 | 58.4 |

TABLE 11-continued

Experimental Comparison Results of Catalysts Stability

| Evaluation stage | | Catalyst | | | | | |
|---|---|---|---|---|---|---|---|
| | | C-9 | C-9B | C-9D | C-9E | C-11 | M |
| test | Terminated aromatic yield wt. % | 53.2 | 52.6 | 54.2 | 54.3 | 51.0 | 51.6 |
| | Difference | 5.6 | 5.8 | 5.2 | 4.9 | 7.2 | 6.8 |
| Activity-recovery test | Aromatic yield in initial activity stage | 53.5 | 52.8 | 53.5 | 53.3 | 51.3 | 52.4 |
| | Aromatic yield in activity-recovered stage | 47.3 | 47.0 | 47.4 | 47.6 | 43.3 | 45.5 |
| | Difference | 6.2 | 5.8 | 6.1 | 5.7 | 8.1 | 6.9 |
| Cabonaeous deposit of catalyst wt. % | | 6.3 | 6.5 | 6.1 | 5.9 | 7.8 | 7.2 |

TABLE 12

Experimental Comparison Results of Catalyst Microactivity

| | | Catalyst | | |
|---|---|---|---|---|
| | | C-9 | C-11 | M |
| 480° C. | Benzene Yield (wt. %) | 13.8 | 12.1 | 12.6 |
| | Conversion (wt. %) | 73.7 | 69.5 | 70.1 |
| 490° C. | Benzene Yield (wt. %) | 28.6 | 24.9 | 26.7 |
| | Conversion (wt. %) | 79.6 | 76.6 | 78.9 |
| 500° C. | Benzene Yield (wt. %) | 49.4 | 44.3 | 46.4 |
| | Conversion (wt. %) | 88.6 | 84.9 | 86.9 |

TABLE 13

Experimental Comparison Results of Catalysts Microactivity

| | | Catalyst | | | |
|---|---|---|---|---|---|
| | | C-5 | C-12 | C-7 | C-14 |
| 480° C. | Benzene Yield (wt. %) | 14.2 | 13.9 | 12.2 | 12.8 |
| | Conversion (wt. %) | 72.3 | 71.3 | 70.0 | 70.9 |
| 490° C. | Benzene Yield (wt. %) | 29.4 | 28.3 | 24.6 | 25.9 |
| | Conversion (wt. %) | 80.6 | 79.4 | 76.8 | 78.4 |
| 500° C. | Benzene Yield (wt. %) | 48.2 | 49.0 | 45.2 | 44.6 |
| | Conversion (wt. %) | 87.5 | 88.0 | 85.4 | 86.0 |

What we claimed is:

1. In the method for producing a naphtha reforming catalyst comprising an alumina substrate and platinum, rhenium and halogen, which method comprises forming said alumina into a substrate, calcining said substrate alumina, impregnating said platinum, rhenium and halogen into the pores of said substrate and sulfiding said catalyst; the improvement, whereby enabling the production of a catalyst having better reforming performance, which comprises, prior to impregnating said alumina catalyst support, acidifying aluminum hydroxide in a steam atmosphere at a temperature of 60° to 250° C. for 2 to 15 hours; then shaping said aluminum hydroxide into said catalyst, calcining said shaped aluminum hydroxide at 450° to 700° C. to form a gamma-alumina catalyst support, and then impregnating said alumina catalyst support to incorporate 0.075 to 0.08 weight percent platinum, 0.075 to 1.5 weight percent rhenium, 0 to 0.4 weight percent titanium, and 0.5 to 2.0 weight percent halogen, all of said weight percents being based on the dry weight of said alumina catalyst support.

2. The method as described in claim 1, wherein said halogen is chlorine(Cl).

3. The method as described in claim 1, wherein the contents of said metals and halogen in said alumina support are preferably in amounts of Pt 0.10–0.25, Re 0.10–1.00, Ti 0.01–0.20, halogen 0.08–1.8 based on the weight percentage of dried alumina.

4. The method as described in claim 1 or claim 3, wherein the Re/Pt ratio of said catalyst is 0.1–3.0 (weight).

5. The method as described in claim 1, wherein the said aluminum hydroxide is calcined at 120° C.-160° C. in a steam atmosphere for 3–6 hours.

6. The method as described in claim 1, wherein the acid concentration for said acidification at high temperature in steam atmosphere is 50 percent by weight.

7. The method as described in claim 1, wherein said support is shaped by sphere-dripping, sphere-rolling and extrusion stripping.

8. The method as described in claim 1, wherein the temperature at which the shaped aluminum hydroxide is calcined is 550° C.-650° C.

9. The method as described in claim 4, wherein Re/Pt ratio of said catalyst is 1.2-2.5 (weight).

10. The reforming catalyst produced by the method as claimed in claim 1.

* * * * *

UNITED STATES PATENT AND TRADEMARK OFFICE
CERTIFICATE OF CORRECTION

PATENT NO. : 5,227,357
DATED : July 13, 1993
INVENTOR(S) : Fengduo SUN et al

It is certified that error appears in the above-indentified patent and that said Letters Patent is hereby corrected as shown below:

Column 12, line 34, change " calcined " to -- acidified --.

Signed and Sealed this

Twelfth Day of July, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,227,357
DATED : July 13, 1993
INVENTOR(S) : Fengduo SUN et al

It is certified that error appears in the above-indentified patent and that said Letters Patent is hereby corrected as shown below:

In column 3, line 47, change "$PtCl_3O_3$" to -- $H_2PtCl_4$ --;

In claim 1, line 16 (column 12, line 17), change "0.08" to --0.8--; and

In claim 5, line 2 (column 12, line 34), change "calcined" to --acidified--.

Signed and Sealed this

Thirtieth Day of May, 1995

Attest:

BRUCE LEHMAN

*Attesting Officer*  *Commissioner of Patents and Trademarks*